United States Patent [19]

Phillips et al.

[11] 4,389,292

[45] Jun. 21, 1983

[54] ZIRCONIUM ISOTOPE SEPARATION

[75] Inventors: D. Colin Phillips, Monroeville; Steven H. Peterson, Murrysville Boro., both of Pa.

[73] Assignee: Westinghouse Electric Corp., Pittsburgh, Pa.

[21] Appl. No.: 270,457

[22] Filed: Jun. 4, 1981

[51] Int. Cl.$^3$ ............................................. B01D 59/00
[52] U.S. Cl. ............................................. 204/158 R
[58] Field of Search ..................... 204/157.1 R, 158 R

[56] References Cited

U.S. PATENT DOCUMENTS 4,330,382  5/1982  Yardley et al. ................. 204/158 R
4,351,707  9/1982  Turro ............................. 204/158 R

OTHER PUBLICATIONS

Kraeutler et al, "Photolysis of Dibenzyl Ketone . . ." *Chem. Phys. Lett.* 70(2) (Mar. 1980) pp. 266–269.
Turro et al, "Magnetic Isotope Effect . . ." *J. Amer. Chem. Soc.* 102(3) (Jan. 1980) pp. 1190–1192.
Stevenson et al, "Partial Photoresolution", *J. Amer. Chem. Soc.* 90(11) (May 1968) pp. 2974–2975.
Johnson et al, "Potassium Tetraoxalatozirconate (IV) . . ." *Inorg. Syn.* vol. 8 (1966) pp. 40–44.

*Primary Examiner*—Deborah L. Kyle
*Attorney, Agent, or Firm*—R. D. Fuerle

[57] ABSTRACT

Disclosed is a method of altering the zirconium 91 isotopic content of zirconium by raising a zirconium chelate ligand from a ground state to an activated state in the presence of a scavenger which reacts with the activated state but not with the ground state, and permitting about 25 to about 75% of the zirconium chelate to react with the scavenger. The reaction may be performed in a solution of the zirconium chelate ligand using water as a solvent. Activation of the zirconium chelate may be accomplished by using light and having a wavelength of about 220 to about 350 nm or by heating to about 80 to about 100° C.

11 Claims, No Drawings

ZIRCONIUM ISOTOPE SEPARATION

BACKGROUND OF THE INVENTION

Due to its low absorption of neutrons, zirconium is very useful as a container for nuclear fuel rods. There are five common isotopes of zirconium, atomic weights 90, 91, 92, 94, and 96, the abundance of which in natural zirconium is 52, 11, 17, 17, and 3%, respectively. The 90 isotope has a very low neutron absorption cross-section, and is therefore an ideal fuel rod cladding, but the 91 isotope has an absorption cross-section about 10 times that of the 90 isotope. Thus, the efficiency of a nuclear reactor can be greatly increased if the 91 isotope is removed from the zirconium used to clad the nuclear fuel. This can be accomplished by a laser isotope process in which a zirconium compound such as zirconium tetrachloride or zirconium tetrapropoxide is exposed to a laser tuned to a wavelength which is absorbed by only the 90 or the 91 isotope. The light excites only the isotope which absorbs it and only the excited isotope reacts with a scavenger to form an easily separated reaction product. While the laser isotope process can produce a pure zirconium 90 isotope, it is a very expensive process.

SUMMARY OF THE INVENTION

We have discovered that certain zirconium compounds can be used to effect the separation of the 91 zirconium isotope from the remaining zirconium isotopes. Our process does not involve the use of a laser to excite particular absorption bands peculiar to certain isotopes. Unlike the laser isotope processes, which usually require a slow and very expensive gaseous reaction, the process of this invention can occur in an aqueous solution. As such, the process of this invention acquires considerably less capital equipment and is therefore much less expensive than the laser isotope processes.

PRIOR ART

An article by Bernhard Kraeutler and Nicholas J. Turro in Chemical Physics Letters, Volume 70, No. 2, entitled, "Photolysis of Dibenzyl Ketone in Micellar Solution Correlation of Isotopic Enrichment Factors With Photochemical Efficiency Parameters," discloses the enrichment of carbon 13 over carbon 12 by the photolysis of dibenzyl ketone using the fact that carbon 13 has a magnetic moment.

The use of magnetic nuclear moment to separate oxygen 17 from oxygen 16 and 18 is disclosed in an article by Nicholas J. Turro and Ming-Fea Chow, entitled, "Magnetic Isotope Effect on the Thermolysis of 9,10-Diphenylanthracene Endoperoxide as a Means of Separation of 17 Oxygen from 16 Oxygen and 18 Oxygen," in the Journal of the American Chemical Society, Vol. 102; 3, January 30, 1980, pps. 1190 to 1192. An article by Kenneth L. Stevenson and James F. Verdieck in the Journal of the American Chemical Society, Vol. 90:11, May 22, 1968, pps. 2974 to 2975, entitled, "Partial Photoresolution Preliminary Studies on Some Oxalato Complexes of Chromium (III)," discloses that an aqueous solution of oxalato chromates can be enhanced in the cis or trans isomers when exposed to polarized light. The polarized light apparently partially dissociates only one of the isomers which then resolves into a racemic mixture.

Frederick A. Johnson, et al., in an article entitled, "Potassium Tetraoxalatozirconate (IV), Hafnate (IV) and Thorate Four in Inorganic Synethesis," Vol. 8, pps. 40 to 44, 1966, discloses the preparation of tetraoxalatozirconate.

DESCRIPTION OF THE INVENTION

The process of this invention makes use of the fact that nucleons—protons and neutrons—have a spin and a magnetic moment. According to the rules of quantum mechanics, the spin of the nucleons can be in one of two directions, which means that the resulting magnetic moment can be in one of two directions. If there is an even number of nucleons, there is no overall magnetic moment on the nucleus because nucleons of opposite spin pair up, cancelling their magnetic moments. However, if the nucleus contains an odd number of nucleons, the unpaired nucleon will give the overall nucleus a small magnetic moment.

The electrons which surround the nucleus also have spins. When one atom is bonded to another atom, the spins of the electrons which form the bond are anti-parallel. But when the bond is broken, the spins relax so that they are no longer anti-parallel. Unless these spins are anti-parallel, the two atoms which form the bond cannot recombine. It has been found that the rate at which the spins of electrons relax when a bond is broken depends on whether or not the atoms are in a magnetic field. It is believed that the spins relax faster when the atoms are in a magnetic field, but whether it is faster or slower, at least it is different. Since an isotope with an odd number of nucleons has its own magnetic field, this affects the relaxation rate of the electrons and therefore the rate at which a broken bond can recombine.

In this invention, a bond in a zirconium compound is broken and when broken, can undergo a reaction with another compound. Since zirconium 91 has an odd number of nucleons, it will have its own magnetic field which will relax the spins of the electrons in the broken bonds faster than the spins will relax in even-numbered isotopes such as zirconium 90. This means that the broken bonds in the zirconium 91 isotope will be slower to reform and therefore will be more likely to engage in a reaction with the scavenger compound than will the broken bonds of the even zirconium isotopes. As a result the original zirconium compound will become depleted in the zirconium 91 isotope and the reaction product of the original zirconium compound with the scavenger will become enriched in the zirconium 91 isotope. Since the reaction product is chemically different from the original compound, it can then be easily separated.

The class of zirconium compounds which we have found useful for separating the zirconium isotopes are known as zirconium chelate ligands. A zirconium chelate is an organic compound in which the atoms of the organic portion of the molecule are coordinated to a zirconium atom. The zirconium chelate is a ligand if each of the organic groups which is coordinated to the zirconium atom is coordinated by at least two bonds. The preferred zirconium chelate ligands may be described by the general formula:

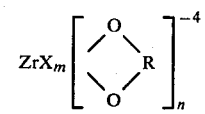

where n is 3 or 4, m is 2(4-n), X is halogen or cyanide, and R is

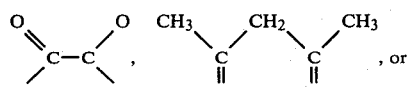, or

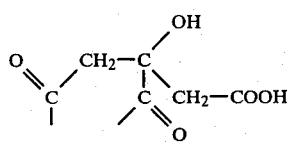

In the second R group given above there are three bonds to each oxygen atom, but this is acceptable because the electrons become delocalized over the whole ring. In the formula, n is preferably four and R is preferably

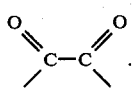

The preferred compound is tetraoxylatozirconate (IV) (TOZ) because that compound is expected to work the best in the process of this invention.

While the process of this invention could be conducted in a gaseous state, a major advantage of the invention is that it can be done in solution because solutions permit the use of much less expensive equipment and a much higher throughput than gases do. Many different solvents can be used to form the solutions such as $H_2O$, methanol, acetone, toluene, benzene, or tetra methyl formamide (TMF), but the solvent is preferably water as it is inexpensive, easy to work with, and does not absorb at the light wavelengths necessary to activate the zirconium chelate ligand. The solution preferably contains about 1 to 25% solids, though higher or lower concentrations may be used if desired.

A scavenger must be present which will react with the zirconium compound in its activated state but which will not react with the zirconium compound in its inactive or ground state. Suitable scavengers include water, cyanide salts, ethylene diamine tetraacidic acid (EDTA), halide ions, or $SO_4^=$. The preferred scavenger is $Cl^-$ *because of its low cost and ease of handling and recycling. The amount of scavenger present is preferably about* 90 to about 110% (by weight) of the amount needed to stoichiometrically react with all of the zirconium compound that is present.

Once the composition is prepared it is necessary to activate the zirconium compound, that is, to break a bond in the compound which can either recombine or react with the scavenger. Activation may be accomplished with either heat or with light. The choice of optical or thermal excitation depends on the energy required to break the bond. The higher the required energy, the more favorable is optical excitation. For thermal excitation, the fraction of molecules in an excited state Ei is proportional to $e^{-Ei/kT}$ where k is Boltzmanns constant and T is the absolute temperature. For a temperature of 100° C., $kT=741$ cal/mole(260 cm$^{-1}$). Typically, electronic transitions in molecules require 10 to 1000 times the thermal energy available at 100° C., so optical excitation is preferred as it gives a faster reaction. If heat is used, the temperature is preferably about 80° to about 100° C. as lower temperatures do not break bonds at a high enough rate and higher temperatures may break other bonds and lead to competing reactions which are not isotope selective. If light is used, it preferably has a wavelength of about 220 to about 350 nm. as the absorption bands of the relevant bonds lie within that wavelength range.

If the zirconium compound is activated for a very long time, all of it will eventually react with the scavenger and there will be no separation of the zirconium isotopes. Therefore, the compound should be heated or exposed to light only for a sufficiently long period of time to react about 25 to about 75% of the amount of zirconium compound which is originally present. Preferably, only about 45 to about 55% of the zirconium compound is reacted. These ranges are selected to produce the optimum degree of separation between the zirconium 91 isotope and the other zirconium isotopes.

Optimization requires calculating the balance between the cost of preparing zirconium of a given isotopic distribution and the value of reactor fuel saved by use of zirconium of that composition in the fuel cladding. Thus the optimum composition is based on economic rather than technical considerations.

Once the reaction has been terminated, the reaction product of the scavenger and the zirconium compound can be separated from the unreacted zirconium compound by a variety of chemical techniques, such as ion exchange column, solvent extraction, precipitation, or high pressure liquid chromotography. The concentration of the zirconium 91 isotope in the reaction product can be further enhanced, or its concentration in the unreacted zirconium further reduced, by repetition of the process of the invention. The unreacted zirconium can be used as is for fuel rod cladding or can be further enhanced in the 90 isotope using a lasor isotope process.

While we do not wish to be bound by any theories, we believe that the following equations describe what is occurring in the process of this invention, using TOZ as an example.

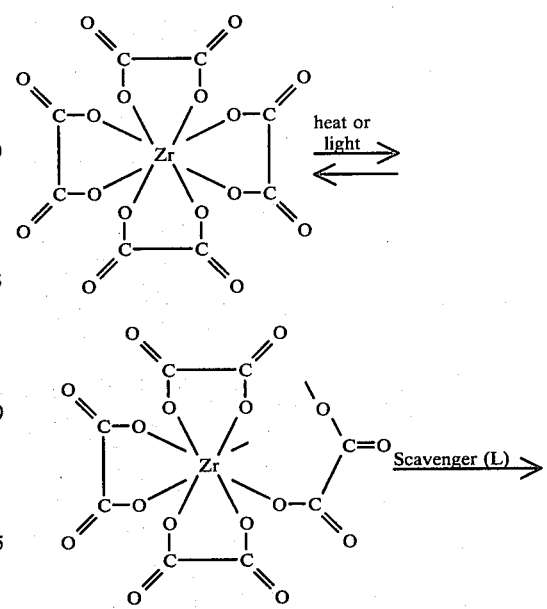

-continued

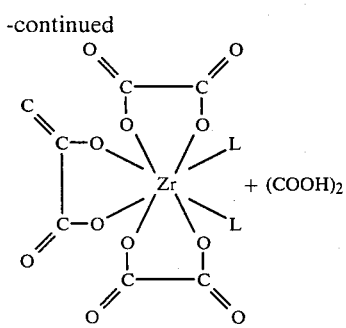 + (COOH)$_2$

The TOZ compound can be readily produced in solution by the addition of ZrOCl$_2$.8H$_2$O to K$_2$C$_2$O$_4$.H$_2$O and H$_2$C$_2$O$_4$.2H$_2$O as described in the Johnson Paper cited under prior art.

The following example further illustrates this invention.

EXAMPLE 100 g of K$_4$Zr(C$_2$O$_4$)$_4$.5H$_2$O (TOZ, 0.14 moles) was dissolved in 1000 mil of water and 55 g of Na$_2$H$_2$N$_2$(CH$_2$)$_2$(CH$_2$CO$_2$)$_4$ (disodium EDTA, 0.14 moles) were mixed in. The solution was irradiated with at $\lambda$=254 nm with a mercury arc lamp until 50% of the Zr complex had been converted to [Zr(C$_2$O$_4$)$_3$(EDTA)]$^{-4}$. The reaction progress can be determined spectroscopically by monitoring the appearance of the product complex, the appearance of free oxalate, or the disappearance of free EDTA. When the reaction had progressed to the desired extent, the reaction was terminated by extinguishing the lamp.

The starting complex and product complex were separated by passing the reaction mixture through an ion exchange column (eg. Dowex-1) and then eluting with 1 M perchloric acid. It was determined that enrichment had occurred by mass spectroscopy.

We claim:

1. A method of altering the $^{91}$Zr isotopic content of zirconium comprising raising a zirconium chelate ligand from a ground state to an activated state in the presence of a scavenger which reacts with said ligand in said activated state but not in said ground state, permitting about 25 to about 75% of said ligand to react with said scavenger, and separating said reacted ligand.

2. A method according to claim 1 wherein said reaction occurs in solution.

3. A method of separating zirconium into a portion having a higher concentration of the $^{91}$Zr isotope and portion having a lower concentration of the $^{91}$Zr isotope comprising:

(A) preparing a composition which comprises:
(1) a zirconium chelate ligand;
(2) a solvent for said zirconium chelate ligand; and
(3) a scavenger which reacts with an excited state of said zirconium chelate ligand but not with its ground state;
(B) exciting said zirconium chelate ligand to said excited state;
(C) permitting about 25 to about 75% of said zirconium chelate ligand to react with said scavenger; and
(D) separating said zirconium chelate ligand from the reaction product of said zirconium chelate ligand with said scavenger.

4. A method according to claim 3 wherein said zirconium chelate ligand has the general formula

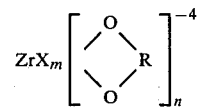

where n is 3 or 4, m is 2(4-n), X is halogen or cyanide, and R is

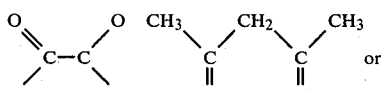 or

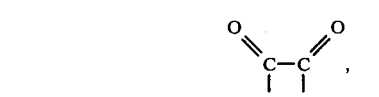

5. A method according to claim 4 wherein n is 4 and R is:

,

6. A method according to claim 3 wherein said zirconium chelate ligand is excited with light having a wavelength of about 220 to about 350 nm.

7. A method according to claim 3 wherein said zirconium chelate ligand is activated by heating to about 80° to about 100° C.

8. A method according to claim 3 wherein said solvent is water.

9. A method according to claim 3 wherein said composition is about 1 to about 25% solids.

10. A method according to claim 3 wherein the concentration of said scavenger is about 90 to about 110% of stoichiometric.

11. A method according to claim 3 wherein about 45 to about 55% of said zirconium chelate ligand is permitted to react with said scavenger.

* * * * *